July 30, 1957  S. LOBEL  2,800,688
DURABLE TUBULAR RUBBER MAT
Filed Aug. 31, 1955  2 Sheets-Sheet 1

INVENTOR.
SIMON LOBEL
BY
J. Ledermann
ATTORNEY

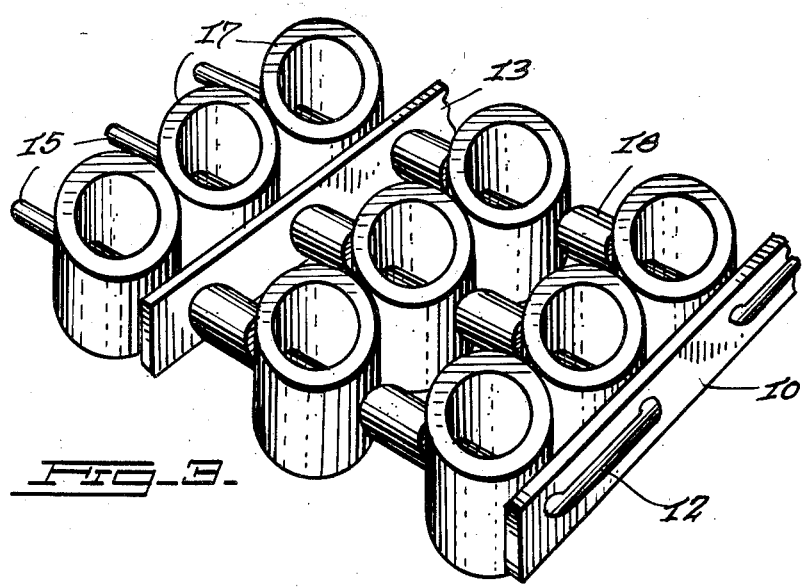
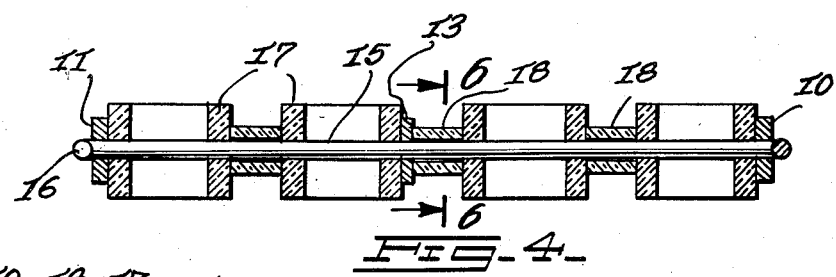
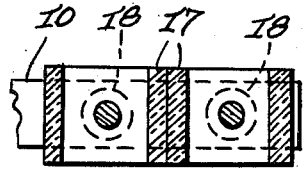
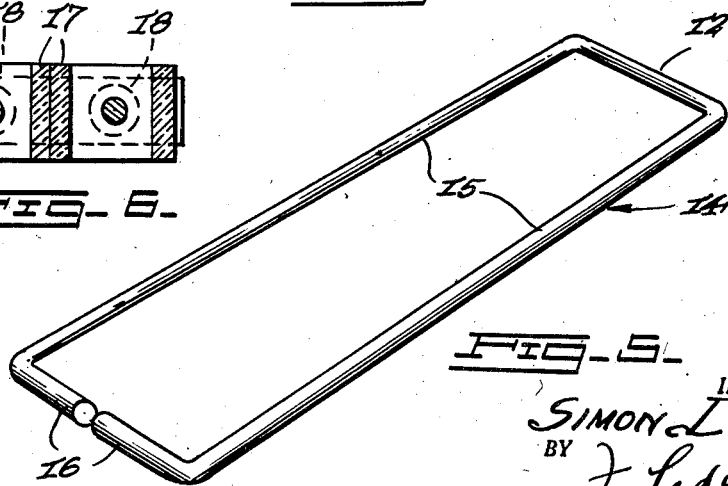
Simon Lobel, Inventor

United States Patent Office 2,800,688
Patented July 30, 1957

2,800,688
DURABLE TUBULAR RUBBER MAT
Simon Lobel, Brooklyn, N. Y.
Application August 31, 1955, Serial No. 531,660
3 Claims. (Cl. 20—78.3)

This invenion relates to door mats, and one object thereof is the provision of a novel and improved durable tubular rubber mat which is simple in construction, inexpensive in cost of manufacture, efficient in operation, and long-lasting in use.

Another object of the invention is the provision of such a mat, constructed of a plurality of similarly-dimensioned tubular rubber sections with their axes at right angles to the plane of the mat and arranged in spaced rows, together with a plurality of smaller tubular rubber sections interposed between the first-mentioned sections or rows and with their axes parallel and lying in the plane of the mat, together with suitable rigid, for example metallic, frame members supporting the tubular sections and providing a bracing and frame for the mat.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing, Fig. 1 is a plan view of a durable tubular rubber mat embodying the features of the present invention.

Fig. 3 is a fragmentary perspective view of the mat.

Fig. 4 is a section taken on the line 4—4 of Fig. 1.

Fig. 5 is a perspective view of one of the two-rodded transverse members of the mat.

Fig. 6 is a sectional view taken on the line 6—6 of Fig. 4.

Figure 1:
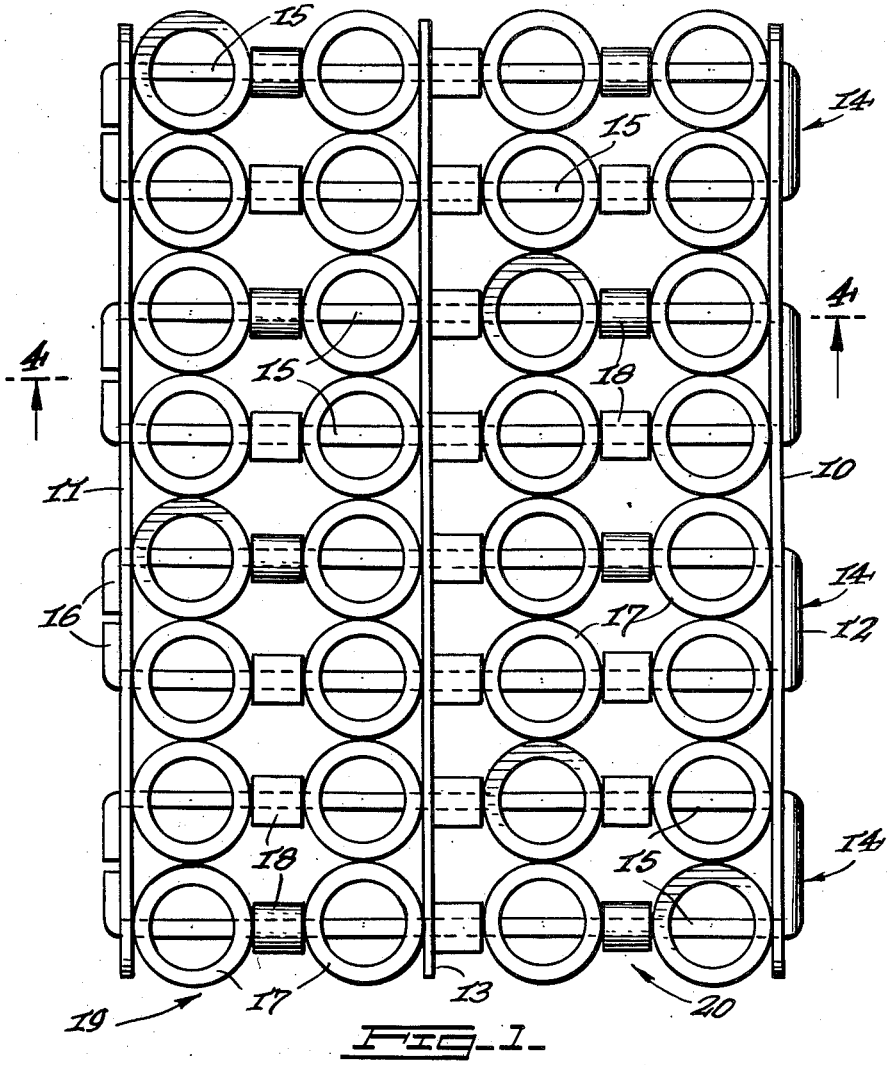

Referring in detail to the drawing, the numeral 10 indicates one and the numberal 11 the other of two longitudinal edge members, preferably made of a metallic and substantially rigid material. As shown, these members have a substantially greater width than thickness, thus giving them a rectangular cross-section. A third longitudinal member 13, substantially identical to the members 10 and 11 although it may be thinner and narrower than the latter, is provided close to but spaced from the longitudinal median line of the mat.

Also provided are a plurality of substantially rigid transverse frames 14, each of which is rectangular in outline, circular in cross-section, and formed of a single length of rod or the like deformed into the rectangular shape. Thus, each member 14 consists of two elongated rods 15. Through aligned holes in the members 10, 11 and 13, the rods 15 of each member 14 are passed through the longitudinal members. Of course, prior to passing the rods through, the rods 15 are straight and parallel throughout their length, being joined by the yoke 12, after being passed through the ends of the rods are flattened, in the form of tongues 16, against the member 11.

Mounted on the rods 15 as described below, are rows of rubber tubular sections 17 and 18, all of which are properly held together in forming the finished mat.

Figure 2:
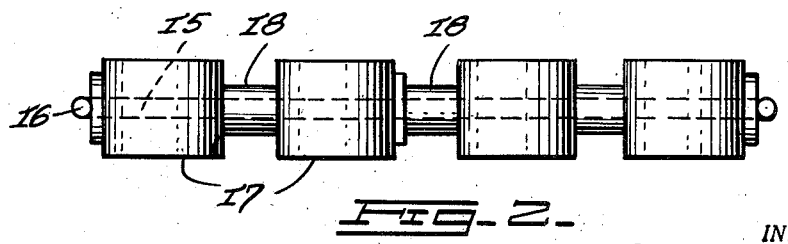
Fig. 2 is an end elevational view of the same.

The tubular sections 17, which may have the same internal and external diameters as a common rubber hose and which may in fact be formed by cutting such a hose into sections, all have a length somewhat greater than the width of the members 10, 11 and 13, as shown in Fig. 2, so that in the finished mat the sections 17, which are positioned with their axes at right angles to the plane of the mat, will have both their upper and lower edges extending beyond the top and bottom edges of the longitudinal members. Each section 17 has aligned diametrically opposed holes through the wall thereof for the passage therethrough of a rod 15.

The tubular sections 18 are all of a smaller diameter than the sections 17 and have a length appropriate to the desired spacing of the sections 17.

In assembling the mat, it is obivous that, beginning with the longitudinal member 10 and with the members 14 extending therethrough prior to deforming the tongues 16, a section 17 is first threaded on each rod 15, then a section 18 is passed over the rod with the rod going through the longitudinal passage in the section 18, and again a section 17, and then another section 18. Then the rods 15 are passed through the longitudinal section 13, and the rows of sections 17 together with the sections 17 therebetween, are threaded on the rods 15. Finally, the longitudinal section 11 is threaded on the rods 15 and, with proper pressure applied between the members 10 and 11 to frictionally lock all the parts therebetween together, the extremities 16 of the rods are turned down against the member 11. It is to be noted that the yoke 12 is straight and at right angles to the rods 15, so that it lies flush against the member 10.

It is to be noted also, in the embodiment of the mat illustrated in the drawing, Fig. 1, that the mat may be deemed to consist of two parts or areas 19 and 20, with the division between the two provided by the longitudinal member 13. The right-hand section or area 20 contains two rows of tubular sections 17 and two alternate rows of sections 18, with one of the latter positioned against the member 13 and one of the former against the member 10. On the other hand, the area 19 contains two rows of sections 17, positioned respectively against the members 11 and 13, with a single row of sections 18 therebetween. Thus, the member 13 is positioned to one side of the median line of the mat, serving as a brace to resist twisting of the mat.

Either surface of the mat serves as the top or bottom in actual use. In either case, the circumferential edges of the sections 17 provide excellent mud or dirt scraping edges for wiping the shoes. It is further to be noted that the spacing between the rods 15 is constant throughout the length of the mat, and is such that each section 17 is in frictional contact with its neighbor or neighbors. Thus, tilting of any of the sections 17 is inhibited.

The mat may of course be made with any desired number of rows of the sections 17 and 18, as well as any desired number of sections in the rows, that is, of any desired area and dimensions.

I claim:

1. A mat comprising two substantially rigid longitudinal members on opposite edges of the mat, a plurality of equidistant transverse rods extending through said longitudinal members, a plurality of spaced longitudinal rows of tubular rubber sections positioned between said members, the number of said sections in a row being equal to the number of said rods, said sections having diametrically aligned openings therethrough and being positioned with their axes at right angles to the mat, said rods passing through said openings of the sections of successive rows, alternate rows of tubular sections of smaller diameter than said first-named sections and of a length shorter than the diameter of said first-named sections positioned between said first-named rows with their axes at right angles to the axes of said first-named sections, said rods passing through the axial passages in said second-named sections, the distance between successive rods being substantially equal to the diameter of said first-named sections, and means for locking said rods to said members.

2. The mat set forth in claim 1, having a third substantially rigid longitudinal member positioned between one of said first-named rows of tubular sections and an adjacent row of said second-named rows of tubular sections.

3. The mat set forth in claim 1, having an additional substantially rigid longitudinal member positioned between one of said first-named rows of tubular sections and an adjacent row of said second-named rows of tubular sections, said rods passing through said additional member, said additional member being positioned adjacent to but spaced from and parallel with the longitudinal median line of the mat.

References Cited in the file of this patent

UNITED STATES PATENTS

| | | |
|---|---|---|
| 1,209,260 | Cary | Dec. 19, 1916 |
| 2,487,027 | Merralls | Nov. 1, 1949 |
| 2,635,307 | Wood | Apr. 21, 1953 |

FOREIGN PATENTS

| | | |
|---|---|---|
| 641,658 | Great Britain | Aug. 16, 1950 |